July 6, 1948. C. ANDERSON 2,444,624
ELECTRICAL BRIDGE AND GALVANOMETER CIRCUITS
Filed Jan. 15, 1946 3 Sheets-Sheet 1

INVENTOR
CLARE ANDERSON
BY
Lawrence K. Sager
his ATTORNEY

July 6, 1948.  C. ANDERSON  2,444,624
ELECTRICAL BRIDGE AND GALVANOMETER CIRCUITS
Filed Jan. 15, 1946  3 Sheets—Sheet 2

INVENTOR
CLARE ANDERSON
BY
Lawrence K. Sager
his ATTORNEY

July 6, 1948.  C. ANDERSON  2,444,624
ELECTRICAL BRIDGE AND GALVANOMETER CIRCUITS
Filed Jan. 15, 1946  3 Sheets-Sheet 3

INVENTOR
CLARE ANDERSON
BY
Lawrence K. Sager
his ATTORNEY

Patented July 6, 1948

2,444,624

UNITED STATES PATENT OFFICE 2,444,624

ELECTRICAL BRIDGE AND GALVANOMETER CIRCUITS

Clare Anderson, Kinnelon, N. J.

Application January 15, 1946, Serial No. 641,318

15 Claims. (Cl. 177—351)

1

This invention relates to electrical apparatus and circuits having various applications such as to the measurement of electrical and physical quantities, indication of the position of movable parts, comparative measurements, responsive control devices and to various other purposes.

This application covers improvements on the disclosures of my pending application Serial No. 532,221, filed April 22, 1944, patented May 7, 1946, No. 2,399,903.

One object of the present improvements is to increase the sensitivity of the apparatus or permit the use of control impedances of inherently low values of change in comparison with the disclosures of said prior application, the increase in sensitivity obtainable being about double, or the minimum change in impedance values being about one-half. Another object is to provide simple and dependable apparatus for refined measurement or response to small changes in values. Another object is to provide apparatus of high sensitivity and to provide a wide range of indication or response for small changes in values with low energy requirements. Other objects and advantages will be understood from the following description and accompanying drawings showing various embodiments of the invention and applications to various uses.

In my said prior application disclosures were made of what may be termed single ratio bridge control. The present invention discloses what may be termed double ratio bridge control and also differential ratio bridge control together with various applications of these controls. It also discloses various applications of single bridge control.

Figure 1:
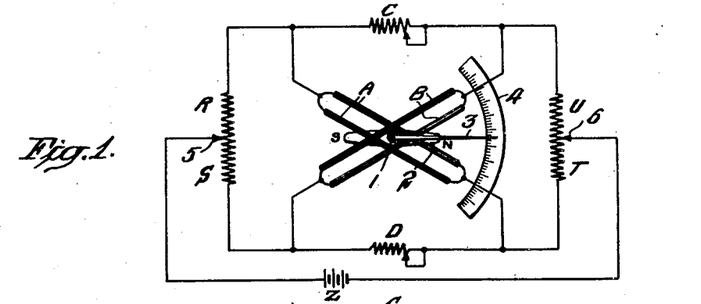
Fig. 1 is a diagram showing one embodiment of the invention in conjunction with a ratio meter.

Fig. 1 discloses a simple form of the double

2 ratio control and of the differential ratio control according to the method of use. In Fig. 1 a ratio indicating instrument is represented having a pair of fixed coils A and a pair of fixed coils B at an angle to the coils A. The coils may be circular, elliptical or of rectangular form. The coils A are centrally positioned within the coils B resulting in the plane of the turns of the coils A being at an angle to the plane of the turns of the coils B as indicated. The coils A and B have the same number of turns as each other and are as nearly as possible identical in geometric shape. At the central space between the coils where they cross is pivotally mounted a staff I supporting a permanent magnet 2. Near the upper end of the staff is carried a pointer 3 which is movable over a fixed graduated scale 4. The two coils A may be considered a single coil and likewise the two coils B, their division being for the purpose of providing a space for the pivotal mounting of the permanent magnet 2 within the coils. The magnet will occupy a position determined by the ratio of the currents in the windings A and B provided the magnet is shielded from the influence of external magnetic fields.

When the currents in the two windings A and B are equal, the permanent magnet will occupy a mid-position, as indicated in Fig. 1. When there is no current in the winding B and the current in winding A is at a maximum, or at any value, the magnet 2 will occupy a position coinciding with the axis of the winding A; and when there is no current in the winding A and a current exists in the winding B, the magnet will occupy a position coinciding with the axis of the winding B. The magnet and needle will take an intermediate position according to the polarity and ratio of the currents in windings A and B. A greater range of movement of the magnet may be obtained over that of Fig. 1 by increasing the angular displacement between the windings A and B, or a small range of movement by decreasing this angle. Also the range of movement of the magnet may be increased or decreased by increasing or decreasing the sensitivity of the bridge network.

Fig. 1 shows a bridge connection of various parts wherein a potentiometer or variable impedance device RS, having an adjustable contact 5, is incorporated. This contact is adjustable in response to change of any controlling factor such as a variable pressure or liquid level, variable optical, thermal, electric and magnetic quantities, etc., and the ratio instrument will reflect the value and changes in values of any such variable factor according to the position of the variable contact. Another potentiometer or variable impedance device TU, having an adjustable contact 6 is also incorporated in the bridge connection. This contact is similarly adjustable in response to any of the above mentioned controlling factors. The means for adjusting or otherwise changing the relative values of RS and TU may be of various forms, with or without the adjustable contacts.

The source Z, indicated as a battery, supplies energy to the bridge, although any suitable direct current source may be provided. The terminals of the source are shown connected respectively to the contacts 5 and 6. A resistive or impedance device C is connected between the terminals of the portions R and U; and a resistive or impedance device D is connected between the terminals of the portions S and T of the variable impedance devices. The coil A is connected from a point between R and C to a point between D and T, forming a shunt or parallel connection with the impedance devices RS and D and likewise forming a shunt or parallel connection with the impedance devices UT and C. The coil B is connected from a point between C and U to the point between S and D, forming a shunt or parallel connection to the impedance devices UT and D and likewise forming a shunt or parallel connection with C and RS.

In other words, the impedance device C is connected between a terminal of the winding A and a terminal of the winding B, the impedance device D is connected between the other terminal of the winding A and the other terminal of the winding B, the variable controlling means RS is connected from the connection between A and C to the connection between B and D, the additional variable controlling means TU is connected from the connection between C and B to the connection between A and D, and the source Z is connected between the variable controlling means RS and TU.

By properly proportioning the relative impedance values of the different parts, a wide range of deflection of the permanent magnet may be obtained according to the positions of the contacts 5 and 6. In order to obtain zero current in the winding B when the slider or contact 5 is at the junction R and C and the contact or slider 6 is at the mid-point of U and T, the following proportion of impedance values must exist:

*Equation 1*

$$\frac{C}{R+S} = \frac{U}{T+D+T\frac{D+R+S}{A}}$$

When the slider 5 is moved from the foregoing end condition towards the other end condition, the current in winding A decreases as the current in winding B increases; and at some intermediate point the currents in the windings A and B are equal, giving a mid-position of the pointer. When the slider 5 is at the junction between S and D and the current in the winding A is zero the following proportion exists and is similar to the foregoing Equation 1:

*Equation 2*

$$\frac{D}{R+S} = \frac{T}{U+C+U\frac{C+S+R}{B}}$$

It follows from the foregoing that the ratio instrument may have a scale marked in terms of the ratio of the fractions of R and S, as disclosed in my said prior application. It is apparent that when the slider 5 is at its mid-position, the slider 6 may be moved to its limits of movement in each direction and when at the junction between C and U and also when at the junction between T and D, the equations for proper proportioning of the relative values are similar to the above Equations 1 and 2 for obtaining zero value of current in the coils A and B when the slider 6 is at its respective limiting positions.

It follows that by the improvement disclosed in Fig. 1, the provision of double control, one at each end portion of the network, attains the same results described in my said prior application and in addition has the quality of responding to control impedances at either or both end portions of the network.

If it be assumed that the slider 5 is at the mid-point of R and S and that the slider 6 is at the junction of T and D and the current in winding B is zero, the impedances of C and D may be decreased in unison and in small increments until they approach zero value. As this change proceeds, the slider 6 must be moved upward along the impedance TU in order to maintain the current in the winding B at zero value. As the limiting condition is approached, the current in the winding A will be decreasing while the current in winding B is maintained at zero value. The terminal ends of the winding A will approach those of the winding B and the current in the winding A will approach zero value and the network then approaches a condition of infinite sensitivity. When the slider 6 is at the mid-point of the impedance TU and the slider 5 is at the junction of R and C and the current in winding B is zero, the impedances in C and D may be decreased in unison and in small increments until they approach zero value. As this change proceeds the slider 5 must be moved downward along the impedance RS to maintain the current in the winding B at zero value. As the limiting condition is approached, the current in the winding A will be decreasing as the current in the winding B is maintained at the zero value. As the terminals of the winding A approach those of the winding B, the current in the winding A approaches zero and the network approaches a condition of infinite sensitivity.

In Fig. 1 if the sliders 5 and 6 are at their mid-positions and if the slider 5 be moved upwardly while the slider 6 is moved downwardly simultaneously, the response of the ratio indicator in one direction from mid-position is double in scale units compared with what it would be for the same motion of only one slider. Similarly, if the sliders be moved from their mid-positions simultaneously in the opposite directions from that just referred to, the ratio indicator would be moved from its mid-position in the opposite direction on the scale by double the amount of movement compared with that obtained by the movement of only one slider. This double ratio bridge control is especially advantageous in applications where high sensitivity is required, or where the coefficients of the control impedances are inherently low.

The disclosures of Fig. 1 may also be used as a differential ratio bridge. It may first be assumed that the slider 5 is at its upper limit of movement and the slider 6 at its mid-position. Then, if the percentage change per unit of travel in the impedance device RS is the same as the percentage change per unit of travel in the impedance device TU and if the sliders 5 and 6 be moved in unison downwardly until the slider 5 is at the center of RS and the slider 6 is at its lower limit of movement, no change will occur in the condition of zero current in the winding B. If on the other hand, the sliders move at different rates downwardly from the positions first considered, the slider 5 moving faster than the slider 6 for example, the condition of zero current in the winding B will no longer hold; and the ratio indicator will move along the scale at a rate proportional in scale units to the differential of the rates of motion of the sliders. If the movement of slider 5 and slider 6 be stopped at some intermediate position between the limits stated, the ratio indicator will assume a position in scale units proportional to the difference of movement of the two sliders. If, assuming that the two sliders are at their mid-positions as shown in Fig. 1, the sliders be moved simultaneously upwardly or downwardly at the same rate then under such conditions equal currents will transverse the windings A and B giving a one to one ratio with the pointer at the mid-position throughout the travel of the sliders in either direction. If, however, the sliders differentiate from unison in motion, the deflection of the indicator will be proportionate to the differentiation.

Various applications of the use of the disclosures of Fig. 1 may be made for securing particular results when used as a double ratio bridge or when used as a differential ratio bridge. In some uses the windings A and B may be replaced by a differential detector, by a differential transformer, by a differential relay and by other responsive means according to the particular requirements. Various applications of the ratio bridge, the double ratio bridge and the differential bridge are hereinafter disclosed for certain selected uses as illustrative examples.

Figure 2:
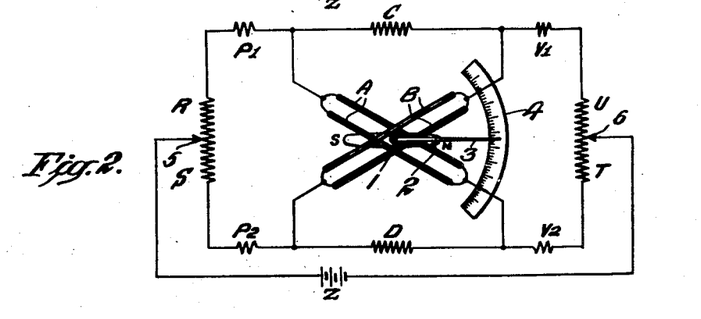
Fig. 2 is a similar diagram with the addition of various impedances in the controlling circuits.

Fig. 2 is the same as Fig. 1, the corresponding parts being indicated by the same reference characters; but in Fig. 2 additional impedance devices P1 and P2 are added in the bridge circuit between R and the junction of winding A and impedance device C, and between S and the junction of winding B and impedance device D respectively; also additional impedance devices V1 and V2 are added between U and the junction of the winding B and impedance device C, and between T and the junction of the winding A and impedance device D respectively. These additional impedance devices serve as additional means to control the sensitivity of response of the network. The impedance values of these additional devices are preferably made equal to each other. When the slider 5 is at the junction of R and P1 and slider 6 is at its mid-position and the current in the winding B is at zero value, and maintaining lateral symmetry beyond RS, the following equation expresses the proper relationship of impedance values:

*Equation 3*

$$\frac{C}{R+S} = \frac{(U+V)(A-C)}{P(4(U+V)+A+C)+(U+V)(A+C)+AC}$$

When the slider 5 is at its mid-position and the slider 6 is at its lower limit, and the current in winding B is at zero value, a proportion similar to the foregoing Equation 3 exists.

Although perfect impedance matching may not be obtained, the following are typical values for obtaining desirable results.

| | Ohms |
|---|---|
| R, S, T and U, each | 4 |
| P1, P2, V1 and V2, each | 96 |
| C and D, each | 2.88 |
| A and B, each | 500 |

The disclosures of Fig. 2 may be utilized as a double ratio bridge or as a differential ratio bridge as described with reference to Fig. 1.

Although the foregoing description has indicated the use of resistive impedances and a direct current source of supply, the control and bridge impedance devices may be resistive, capacitive, inductive, or various combinations thereof; and an alternating current supply may be used instead of a direct current source.

Compensation for temperature changes when copper is used in the A and B windings and in the bridge leads, may be accomplished by the use of copper and manganin to obtain the necessary temperature coefficients of resistance in the impedance devices C and D as explained in my said prior application, or in various other ways.

Figure 3:
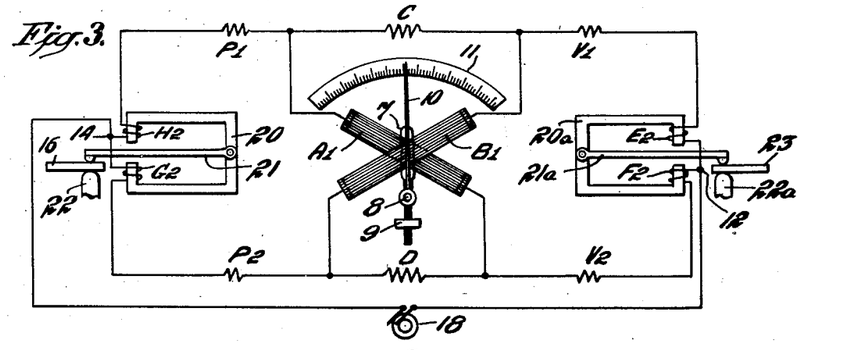
Fig. 3 is a diagram showing the invention applied to the measurement of the dimension of an object in comparison with a standard.

Fig. 3 shows an embodiment of the invention illustrating the application of the differential bridge control. In the particular application shown the variable control impedance devices are inductive and a different form of indicator is utilized. The previously referred to windings A and B are connected to the circuit in the same manner as previously described and are shown as fixed coils or windings A1 and B1 at an angle to each other and one positioned within the other, the planes of their turns being perpendicular to the plane of the paper. Within the windings A1 and B1 is located a soft iron vane 7 extending vertically. The lower end of the vane is fixed to a pivoted staff 8 located below the two windings. A nut 9 is threaded on an extension of the vane below the pivot for adjustment as a counterweight. The staff 8 carries near its front end an upwardly extending pointer 10 in front of the two windings and movable over the scale 11. Here an inductive winding H2 is connected between the junction point 14 and the impedance device P1 and is mounted on one leg of a laminated iron reactor core 20. A winding G2 is connected between the impedance device P2 and the junction point 14 and is located on the other leg of the core 20. A return path of the flux created by these windings is through the iron lever 21 pivoted on the yoke portion of the core and extending outwardly between the end portions of the core. The outer end of the lever is adapted to engage a plate or other element 16 when inserted between a fixed support 22 and the end of the lever. The other control portion of the network has a winding E2 connected between the impedance device V1 and the junction point 12 and is mounted on one leg of a laminated iron reactor core 20a. A winding F2 is connected to the impedance device V2 and to the junction point 12 and is mounted on the other leg of the core. The lever 21a is pivotally mounted upon the yoke portion of the core and extends outwardly between the poles of the core. Its outer end engages a plate or element 23 of standard thickness, this element being interposed between the end of the lever and the fixed support 22a. Assuming that the standard 23 is of such thickness that the lever 21a occupies a mid-position, then if the element 16 to be tested is of the same thickness, the lever 21 will likewise occupy a mid-position and no deflection of the indicator will take place. If, however, the element 16 is of greater or less thickness than the standard, the unbalancing of the network will result in the indicator being deflected to one side or the other of its mid-position to an extent determined by the variation of the thickness from the standard. Now assume that a standard 23 is introduced which is of greater thickness than the one just considered, then the lever 21a will occupy a position above its mid-position. In that case if the element 16 is of the same thickness as the new standard, its lever 21 will be raised above its mid-position to an amount corresponding to the raised position of the lever 21a. In that case there will be no deflection of the indicator in accordance with the explanations made in connection with Figs. 1 and 2 with reference to the differential ratio bridge control. But if the element 16 is of greater or lesser thickness than the standard, the indicator will be deflected to one side or the other of the mid-position to an extent determined by the variation from the standard in accordance with the differential action explained in connection with Figs. 1 and 2.

Figure 4:
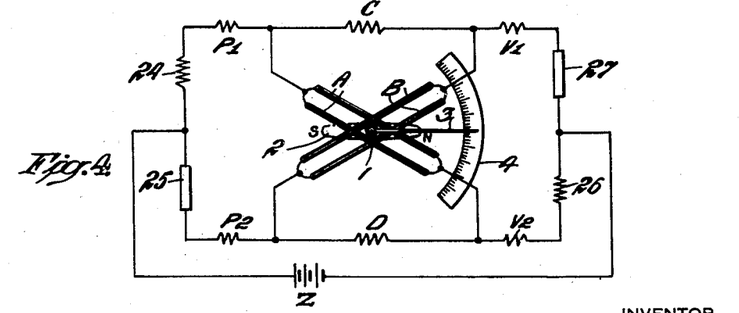
Fig. 4 is a diagram showing the invention applied to temperature measurements or indications of temperature variations from normal.

Fig. 4 is an embodiment of the invention for indicating temperatures, or deviations of temperatures from normal. It embodies the double ratio bridge control. Fig. 4 is similar to Fig. 2 except the variable impedances R, S, T and U are replaced respectively by a resistor 24 having a positive temperature coefficient of resistance and a resistor 25 having a negative temperature coefficient of resistance, a resistor 26 having a positive temperature coefficient of resistance and a resistor 27 having a negative temperature coefficient of resistance. These resistors are adjusted or fixed at values such that at the normal temperature, the indicator will occupy a mid-scale position. When the temperature to which these resistors is subjected is increased, the resistance of 24 and 26 will be increased and the resistance of 25 and 27 will be decreased. The result corresponds to moving the slider 6 of Fig. 2 upwardly and to the moving of slider 5 of Fig. 2 downwardly. This results in a deflection of the indicator from its mid-position in one direction in accordance with the explanations already given in connection with Figs. 1 and 2. When the temperature to which the resistors 24, 25, 26 and 27 of Fig. 4 is subjected is decreased below normal, the reverse action takes place and the indicator will be deflected in the opposite direction from its mid-position in accordance with the degree of change of temperature from the mid-scale value.

Figure 5:
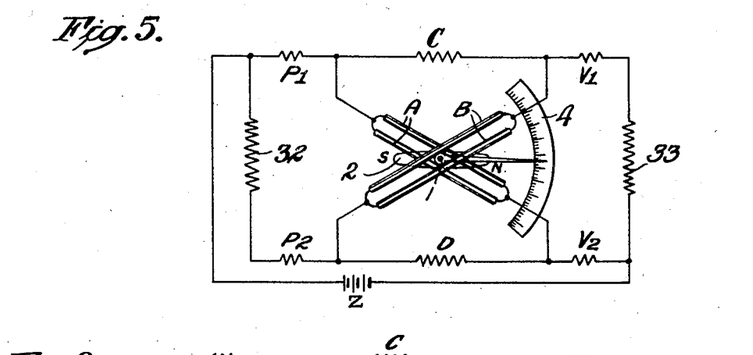
Fig. 5 is a diagram showing the invention applied to measurements of resistance.

Fig. 5 is an embodiment of the double ratio bridge control applied for use as a temperature indicator. The end connections of the network comprise a resistive device 32 connected across one end of the network between the impedance devices P1 and P2 and a resistive device 33 connected across the other end of the network between the impedance devices V1 and V2. A source 3 is connected to a junction between P1 and 32 and to the junction between V2 and 33. The resistive devices 32 and 33 may both have a positive temperature coefficient of resistance or both have a negative temperature coefficient of resistance and are located at the region where the temperature changes are to be measured. The connections shown in Fig. 5 correspond with those of Fig. 2 assuming that the contact 5 is moved to its upper limit and the contact 6 is moved to its lower limit. Under such conditions, it may be assumed that the resistance of the devices 32 and 33 is such that at the highest temperature to be indicated, the deflection of the indicator will be to the full scale limit in one direction. Assuming that the resistive devices 32 and 33 have a positive temperature coefficient of resistance, then any temperature below the assumed highest temperature will cause a decrease in the resistance of these devices resulting in the double ratio bridge action causing a deflection of the indicator from the full scale position to a position corresponding to the fall in temperature. Thus the indicator will assume a position on the scale corresponding to the temperature to which the devices 32 and 33 are subjected. In case these devices have a negative temperature coefficient of resistance and have a value to give a full scale deflection in one direction at the coldest temperature to be indicated, then any increase in temperature would cause a deflection in the opposite direction and give an indication corresponding thereto.

The disclosure of Fig. 5 can also be used for measurement of resistance instead of temperature measurement by replacing 33 by a resistive device of suitable known resistance and connecting the unkown resistance device in place of the device 32. The indicator may then be calibrated to show the value of the resistive device of unknown value.

The disclosures of Fig. 5 may also be used as a single ratio bridge control for indication of impedance, or as a single ratio bridge for indication of temperature, by replacing 33 by an impedance device which would maintain a fixed appropriate value under changes in temperature, that is one having zero temperature coefficient of resistance. The device 32 as it responds to temperature changes would indicate a corresponding change on the meter. By using an indicator of the form shown in Fig. 3, the apparatus of Fig. 5 may use an alternating current source and in that case the unknown impedance of a device may be measured by substituting the device in place of the device 32.

Figure 6:
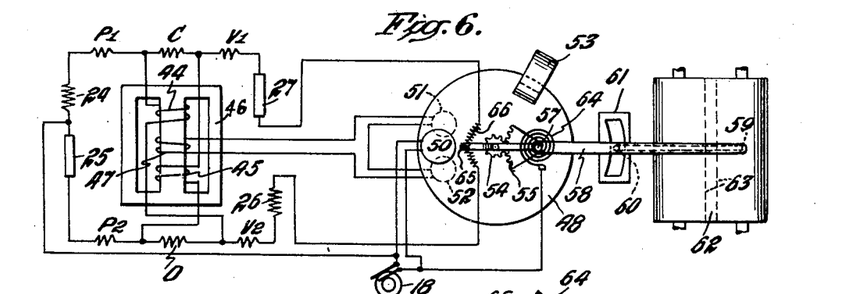
Figs. 6 and 7 are diagrams showing the invention applied to the continuous recording of temperature changes.
Figures 7, 8:
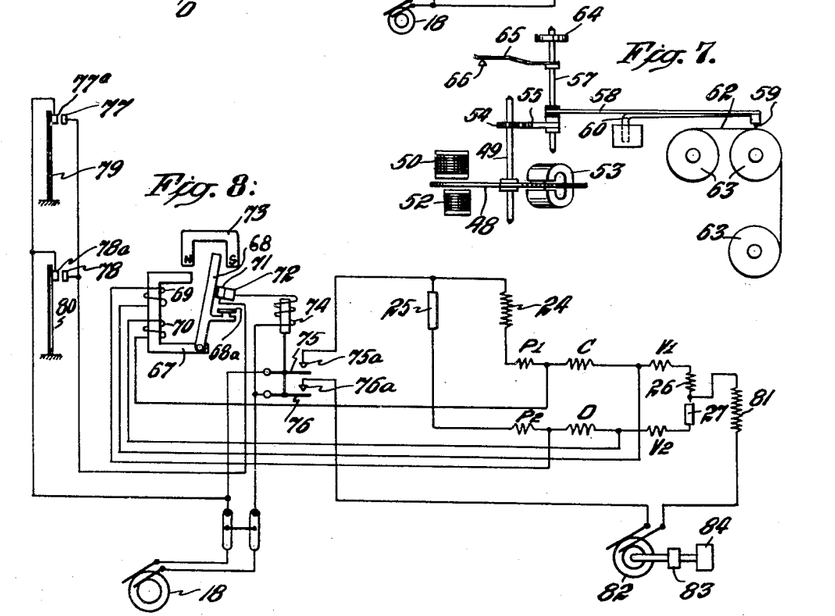
Fig. 8 is a diagram showing the invention applied to oil burner control for heating purposes.

Figs. 6 and 7 show an embodiment of the double ratio bridge control with differential detection and differential compensation for continuously recording temperature changes. As to the response of the network to change of temperatures, this embodiment is based upon the disclosures of Fig. 4 and responds in the network in the same manner, the parts C, D, 24, 25, 26 and 27 of Fig. 6 corresponding to similarly indicated parts in Fig. 4. However, instead of using a ratio meter, the windings A and B of Fig. 4 are replaced in Fig. 6 by the controlling inductive windings 44 and 45 on the middle leg of a reactor core 46 having three legs. The windings 44 and 45 are connected in a manner that the magnetizing forces of the currents thereof oppose each other under balanced conditions of the bridge network. A third auxiliary winding 47 is also on the middle leg of the core 46 and is subjected to induced currents from the windings 44 and 45. When the currents through the two sides of the bridge network are equal, no current is induced in the winding 47. When the current in winding 44 predominates over the current in winding 45 in response to decrease of temperature, a current is induced in winding 47; but when the current in the winding 45 predominates over that in winding 44 due to increase in temperature, a current will be induced in the winding 47 of opposite phase from that induced when the current in winding 44 predominates. This reversal of phase and change in value of the currents induced in winding 47 is utilized to operate a reversible motor for recording purposes.

This motor may be of any suitable form but is indicated as of a reversible watthour meter type. As indicated in Figs. 6 and 7, the motor comprises a metal disk 48 carried by a pivotally mounted staff 49. Above the disk 48 near the periphery is fixed a winding 50 having its axis at right-angles to the plane of the disk and is excited from an alternating current source, such as 18. Below the disk and to one side of the winding 50 is another winding 51. A winding 52 similar to the winding 51 is also positioned below the disk and at the other side of the winding 50. The axes of the windings 51 and 52 are at right-angles to the plane of the disk. The windings 51 and 52 are connected in series with each other and with the winding 47. In some cases amplifying means may be introduced between the winding 47 and the motor windings 51 and 52 for increasing the energy supplied to the latter windings when necessary. The motor windings 50, 51 and 52 on opposite sides will be provided with properly related and proportioned magnetic frames, but such structure is not necessary to be described herein, it being sufficient to appreciate that when the phase of the current delivered from the winding 47 to the motor windings 51 and 52 is that corresponding to the predominating effect of the winding 44, the motor will be actuated in one direction but when the phase of the current is opposite by the predominating effect of winding 45, the actuation of the motor will be in the opposite direction. A permanent magnet 53 is indicated having its poles on opposite sides of the disk 48 to dampen its movement.

The staff 49 has fixed thereto a small gear 54 which in turn engages a segmental gear 55 which is fixed to another pivoted staff 57. The staff 57 has fixed thereto an arm 58 carrying a pen 59 supplied with ink by means of a capillary tube 60 extending from the pen to an inkwell 61. Below the pen 59 is a continuously moving strip of paper 62 carried by the rolls 63.

The upper part of the staff 57 is insulated from the lower portion and has attached thereto one end of a spiral spring 64, the other end of which is fixed. The upper portion of the staff 57 also has attached thereto a contact arm 65, on the outer end of which engages a potentiometer 66 for forming a variable resistive control. One end of the potentiometer is connected to the temperature responsive resistive device 27 and the other end of the potentiometer is connected to the temperature responsive resistive device 26. Current is supplied to the network by a connection from one side of the source 18 to and through the spring 64, through the upper portion of the staff 57 to the contact arm 65 where the path then divides in the two portions of the potentiometer from which connection is made to the opposite sides of the bridge network. The return path from the network to the source is from a point between the devices 24 and 25 to the source 18.

In operation at equilibrium the currents in the two sides of the network are balanced and no current is induced in the winding 47; and the recording arm rests at a position corresponding to the temperature being measured as shown in Fig. 6. When the temperature decreases and the current in winding 44 predominates over that in winding 45, the current induced in the winding 47 will cause the actuation of the motor, or disk 48, in one direction. This movement causes the gear 54 to turn the segmental gear 55 and its staff and the potentiometer arm 65 in such a direction as to bring the currents in the windings 44 and 45 into balance which stops the movement of the disk 48 and the recording arm 58 at a position corresponding to the new value of temperature. When the temperature increases, the reverse action takes place, it being understood that the force exerted by the spring 64 is not sufficient to overcome the friction of repose of the parts.

The apparatus of Figs. 6 and 7 may be utilized with a single differential bridge control by omitting the responsive resistors 26 and 27. Also by replacing the control resistors 24, 25, 26 and 27 by other suitable control means: physical, optical, electronic or electrical quantities may be recorded. Also the disclosures of Figs. 6 and 7 may be utilized for the continuous recording of changes in frequency by replacing the resistors 24, 25, 26 and 27 by frequency responsive means.

Fig. 8 shows an embodiment of a double differential bridge control for operation of an oil burner motor. In this figure the impedance devices C and D and the temperature responsive resistors 24, 25, 26 and 27 correspond to the same parts as in Fig. 4 except the position of the resistors 26 and 27 is reversed in Fig. 8 from that shown in Fig. 4. An inductive differential responsive control is utilized for controlling a relay having a reactive core or frame 67 and a pivoted armature 68. The relay frame carries a winding 69 which is connected from one end of the impedance device C to the opposite end of the impedance device D in the network. Also carried on the relay frame is another winding 70 which is connected from the other end of the impedance device C to the opposite end of the impedance device D. The windings 69 and 70 are connected to cause the magnetizing forces to oppose each other; and when the bridge network is in balance, the armature 68 will not be moved to its attracted position. The armature carries an insulated contact 71 which in the unattracted position of the armature engages a fixed contact 72. A permanent magnet 73 is positioned opposite the end of the armature 68 for exerting a force to hold the armature in either its unattracted or attracted position. An auxiliary relay having a winding 74 is provided for closing or opening the burner motor circuit and the circuit of the bridge network by control of the movable contacts 75 and 76. These contacts are adapted to engage fixed contacts 75a and 76a when the relay is energized. The winding 74 is connected to the contact 72 and to one side of the source 18. The contact 71 is connected to fixed contacts 77 and 78 which are adapted to be engaged respectively by movable contacts 77a and 78a. These movable contacts are controlled by thermostats of the usual form, such as bimetallic strips 79 and 80. The contacts 77a and 78a are connected to the other side of the source 18. The thermostat 79 may be located to respond to changes of room temperatures and the thermostat 80 when used may be positioned to respond to change of water temperatures, as when the furnace is used for hotwater heating.

The resistive devices 24 and 25 are located or positioned to serve as stack exploring units and be responsive to change of temperature of the stack gases. The responsive resistors 26 and 27 are located remote from the stack heating but are separately heated by a heating resistor 81 which is connected from the junction between the units 26 and 27 to one terminal of the motor 82 which drives the fuel pump 83 and the fan 84 supplying the furnace; and this heater 81 will heat up the resistors 26 and 27 as long as the motor 82 is in operation. The other terminal of the motor 82 is connected to the contact 76a and when engaged by the movable contact 76 is connected to one side of the source 18. The contact 75a is connected to the junction between responsive units 24 and 25 at one end of the bridge circuit and when the contact 75a is engaged by the movable contact 75, this end of the bridge circuit is connected to the other side of the source 18. Thus the path of the current from the source when the contacts 75 and 76 engage their fixed contacts is from one side of the source 18 through the contacts 76, 76a, through the motor 82, heating resistor 81 to one end of the bridge circuit and then through the bridge circuit to the contact 75a, 75 to the other side of the source.

Fig. 8 shows the parts in their inoperative condition with the armature 68 in its unattracted position, having been moved thereto by the reset button 68a. When one or the other of these responsive thermostats 79, 80 engages its fixed contact, the circuit is closed from the source 18 through one of the thermostatic control contacts to the contact 71, contact 72 and relay winding 74 to the other side of the circuit. This auxiliary relay then moves its contacts 75, 76 to engage their fixed contacts and closes the bridge circuit to the heater 81 and motor 82 as previously traced. If the ignition control of the furnace has then operated properly it will start the heating of the furnace which will result in the gradual heating of the stack units 24 and 25. Also, the responsive units 26 and 27 will be correspondingly heated by the heater 81 in the circuit of the bridge and motor. This results in the differential ratio bridge control corresponding to the action when the sliders 5 and 6 of Figs. 1 and 2 are simultaneously and correspondingly moved upwardly. As already explained with reference to those figures, this causes no deflection of the indicator of Figs. 1 and 2; and the corresponding action as just described with reference to Fig. 8 will result in no unbalance in the currents passing through the windings 69 and 70 of the differential cutout relay. Under such conditions the furnace continues its heating action without disturbance. But if the ignition of the fuel had not occurred in the starting action, then the responsive units 24 and 25 would not be heated, although the responsive units 26 and 27 would be heated. The action then would correspond to the movement of only one of the sliders, such as 6, of Figs. 1 and 2. This, as already explained, gives an unbalancing of the bridge circuit and causes one of the windings 69 and 70 of the differential relay to receive a greater current than the other. This action results in attracting the armature 68 and opening the circuit of the winding 74 which in turn opens the contacts of the auxiliary relay, thereby cutting off the supply of current to the bridge circuit and the motor 82. The permanent magnet 73 will continue to hold the armature 68 in its attracted position until manually reset to its unattracted position by the button 68a for further operation of the apparatus after the defect in the ignition has been corrected. It may be noted that if a defect occurs in any of the circuits of Fig. 8, or the burner loses ignition during a heating run, it will result in protectively stopping operation of the motor.

Figure 9:
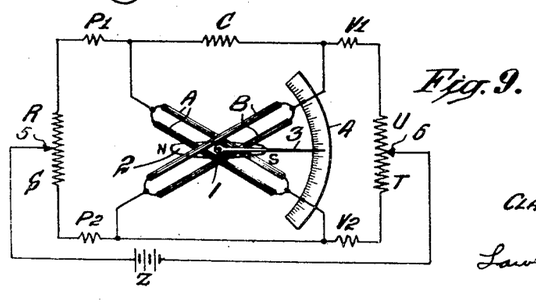
Fig. 9 is a diagram of a modified form of bridge circuit applicable to the foregoing figures.

In some cases sufficiently satisfactory results may be obtained by modifying each of the foregoing disclosures by the omission of one of the impedance devices C or D. Such a modification for example is shown in Fig. 9 which is the same as Fig. 2 except the impedance device D has been omitted. This omission is applicable to each of the other figures and to various other embodiments of this invention. The bridge circuit is then asymmetric but is capable of use in cases where the full advantage of the symmetric circuit is not needed.

In the accompanying figures showing various embodiments of the apparatus, certain of the control devices have been indicated as having fixed values but it will be understood that they may be made adjustable if desired for adaptation to standard responsive instruments and other devices. Also means may be provided where necessary to counter-act the effect of temperature changes which would otherwise introduce errors in the position of the indicators, such means having been described in my said prior application. Also, although the impedance devices have been mainly described as resistive in a number of the foregoing descriptions, such devices may be either resistive, capacitive or inductive, or combinations thereof, according to the requirements of a particular application of the invention. Although certain embodiments of the invention have been disclosed, it will be understood that various modifications may be made without departing from the scope of the invention for adaptation to particular purposes.

I claim:

1. Bridge connected apparatus comprising a responsive device having at least one controlling winding and a second controlling winding, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, additional variable controlling means connected in a circuit from the connection between said first named winding and said second impedance device to the connection between said second winding and said first named impedance device, said additional controlling means being variable independently of said first named controlling means, and a source of energy connected between said first named and said additional variable controlling means.

2. Bridge connected apparatus comprising a responsive device having at least one controlling winding and a second controlling winding, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, additional variable controlling means connected in a circuit from the connection between said first named winding and said second impedance device to the connection between said second winding and said first named impedance device, said additional controlling means being variable independently of said first named controlling means, a source of energy connected between said first named and said additional variable controlling means, and an impedance device connected respectively in series in the circuit of each of said variable controlling means in their respective said connections to said windings and said first named and said second impedance devices.

3. Bridge connected apparatus comprising a responsive device having a stationary reactive core and having at least one controlling winding on the core and a second controlling winding on the core, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, and a source of energy connected in a circuit from said variable controlling means to the connection between said first named winding and said second impedance device and to the connection between said second winding and said first named impedance device.

4. Bridge connected apparatus comprising a responsive device having a stationary reactive core and having at least one controlling winding on the core and a second controlling winding on the core, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, additional variable controlling means connected in a circuit from the connection between said first named winding and said second impedance device to the connection between said second winding and said first named impedance device, and a source of energy connected between said first named and said additional variable controlling means.

5. Bridge connected apparatus comprising a responsive device having at least one controlling winding and a second controlling winding, an impedance device connected between a terminal of said first named winding and a terminal of said second winding, a second impedance device connected between the other terminal of said first named winding and the other terminal of said second winding, reactive inductive means having at least two inductive windings connected in a circuit from the connection between said first named controlling winding and said first named impedance device to the connection between said second controlling winding and said second impedance device, said inductive means having adjustable means for varying the relative reactance of said inductive windings, and a source of energy connected in a circuit from said inductive means to the connection between said first named controlling winding and said second impedance device and to the connection between said second controlling winding and said first named impedance device.

6. Bridge connected apparatus comprising a responsive device having at least one controlling winding and a second controlling winding, an impedance device connected between a terminal of said first named winding and a terminal of said second winding, a second impedance device connected between the other terminal of said first named winding and the other terminal of said second winding, reactive inductive means having at least two inductive windings connected in a circuit from the connection between said first named controlling winding and said first named impedance device to the connection between said second controlling winding and said second impedance device, said inductive means having at least two additional inductive windings connected in a circuit from the connection between said first named controlling winding and said second impedance device to the connection between said second controlling winding and said first named impedance device, said inductive means having adjustable means for varying the relative reactance of said inductive windings, and a source of energy connected in a circuit between said first named inductive windings and said additional inductive windings.

7. Bridge connected apparatus comprising a responsive device having at least one controlling winding and a second controlling winding, an impedance device connected between a terminal of said first named winding and a terminal of said second winding, a second impedance device connected between the other terminal of said first named winding and the other terminal of said second winding, reactive inductive means having at least two inductive windings connected in a circuit from the connection between said first named controlling winding and said first named impedance device to the connection between said second controlling winding and said second impedance device, said inductive means having at least two additional inductive windings connected in a circuit from the connection between said first named controlling winding and said second impedance device to the connection between said second controlling winding and said first named impedance device, said inductive means having adjustable means for varying the relative reactance of said inductive windings, and a source of energy connected in a circuit between said first named inductive windings and said additional inductive windings, said adjustable means being movable to vary the reactance of said first named inductive windings inversely relatively to each other and to vary the reactance of said additional inductive windings inversely relatively to each other.

8. Bridge connected apparatus comprising a responsive device having at least one controlling winding and a second controlling winding, an impedance device connected between a terminal of said first named winding and a terminal of said second winding, a second impedance device connected between the other terminal of said first named winding and the other terminal of said second winding, devices differently responsive to change of temperature connected in a circuit from the connection between said first named controlling winding and said first named impedance device to the connection between said second controlling winding and said second impedance device, additional devices differently responsive to change of temperature connected in a circuit from the connection between said first named controlling winding and said second impedance device to the connection between said second controlling winding and said first named impedance device, and a source of energy connected between said first named temperature responsive devices and said additional temperature responsive devices.

9. Bridge connected apparatus comprising a responsive device having at least one controlling winding and a second controlling winding, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, additional variable controlling means connected in a circuit from the connection between said first named winding and said second impedance device to the connection between said second winding and said first named impedance device, said additional controlling means being variable independently of said first named controlling means, and a source of energy connected from the connection between said first named variable controlling means and said first named winding to the connection between said additional variable controlling means and said second impedance device.

10. Bridge connected apparatus comprising a responsive device having a stationary reactive core and having at least one controlling winding on the core and a second controlling winding on the core, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, a source of energy connected in a circuit from said variable controlling means to the connection between said first named winding and said second impedance device and to the connection between said second winding and said first named impedance device, an additional winding on said reactive core subjected to change of current induced therein due to variations of said variable controlling means, and responsive means controlled by said additional winding.

11. Bridge connected apparatus comprising a responsive device having a stationary reactive core and having at least one controlling winding on the core and a second controlling winding on the core, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, a source of energy connected in a circuit from said variable controlling means to the connection between said first named winding and said second impedance device and to the connection between said second winding and said first named impedance device, an additional winding on said reactive core subjected to change of phase of current induced therein due to variations of said variable controlling means, and variable recording means controlled by change of phase of the current in said additional winding.

12. Bridge connected apparatus comprising a responsive device having a stationary reactive core and having at least one controlling winding on the core and a second controlling winding on the core, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, additional variable controlling means connected in a circuit from the connection between said first named winding and said second impedance device to the connection between said second winding and said first named impedance device, a source of energy connected between said first named and said additional variable controlling means, an additional winding on said reactive core subjected to change of current induced therein due to variations of said variable controlling means, and responsive means controlled by said additional winding.

13. Bridge connected apparatus comprising a relay having at least one controlling winding and a second controlling winding, an impedance device connected between a terminal of said first named winding and a terminal of said second winding, a second impedance device connected between the other terminal of said first named winding and the other terminal of said second winding, variable controlling means connected in a circuit from the connection between said first named winding and said first named impedance device to the connection between said second winding and said second impedance device, additional variable controlling means connected in a circuit from the connection between said first named winding and said second impedance device to the connection between said second winding and said first named impedance device, a source of energy connected between said first named and said additional variable controlling means, and means controlled by said relay for opening the circuit from said source to said variable controlling means upon relative change of current in said controlling windings.

14. Bridge connected apparatus comprising a responsive device having at least one controlling winding and a second controlling winding, an impedance device connected between a terminal of said first named winding and a terminal of said second winding, a closed circuit connection between the remaining terminals of said two windings, variable controlling means connected in a circuit from the connection between said first named winding and said impedance device to said closed circuit connection, additional variable controlling means connected in a circuit from the connection between said second winding and said impedance device to said closed circuit connection, said additional controlling means being variable independently of said first named controlling means, and a source of energy connected between aid first named variable controlling means and said additional variable controlling means.

15. Bridge connected apparatus comprising a responsive device having at least one controlling winding and a second controlling winding, an impedance device connected between a terminal of said first named winding and a terminal of said second winding, a direct circuit connection between the remaining terminals of said two windings, variable controlling means connected in a circuit from the connection between said first named winding and said impedance device to said direct circuit connection, impedance means connected in a circuit from the connection between said second winding and said impedance device to said direct circuit connection, and a source of energy connected between said variable controlling means and said impedance means.

CLARE ANDERSON.

REFERENCES CITED

The following references are of record in the file of this patent:

UNITED STATES PATENTS

| Number | Name | Date |
|---|---|---|
| 877,311 | Evershed | Jan. 21, 1908 |
| 1,449,437 | Obermaier | Mar. 27, 1923 |
| 2,298,893 | Macintyre | Oct. 13, 1942 |
| 2,389,449 | Middel | Nov. 20, 1945 |
| 2,396,244 | Borsum | Mar. 12, 1946 |
| 2,399,903 | Anderson | May 7, 1946 |

FOREIGN PATENTS

| Number | Country | Date |
|---|---|---|
| 335,240 | Great Britain | Sept. 18, 1930 |